HIDDEN CHANNEL COMMUNICATIONS SYSTEM

Filed April 5, 1962

INVENTOR,
VICTOR G. ROBATINO
BY Jack H. Linscott
ATTORNEY,

United States Patent Office 3,499,992
Patented Mar. 10, 1970

3,499,992
HIDDEN CHANNEL COMMUNICATIONS SYSTEM
Victor G. Robatino, Red Bank, N.J., assignor to the United States of America as represented by the Secretary of the Army
Filed Apr. 5, 1962, Ser. No. 185,791
Int. Cl. H04m 3/16
U.S. Cl. 179—1.5 10 Claims The invention described herein may be manufactured and used by or for the Government for governmental purposes without the payment of any royalty thereon.

Figures 1, 2:
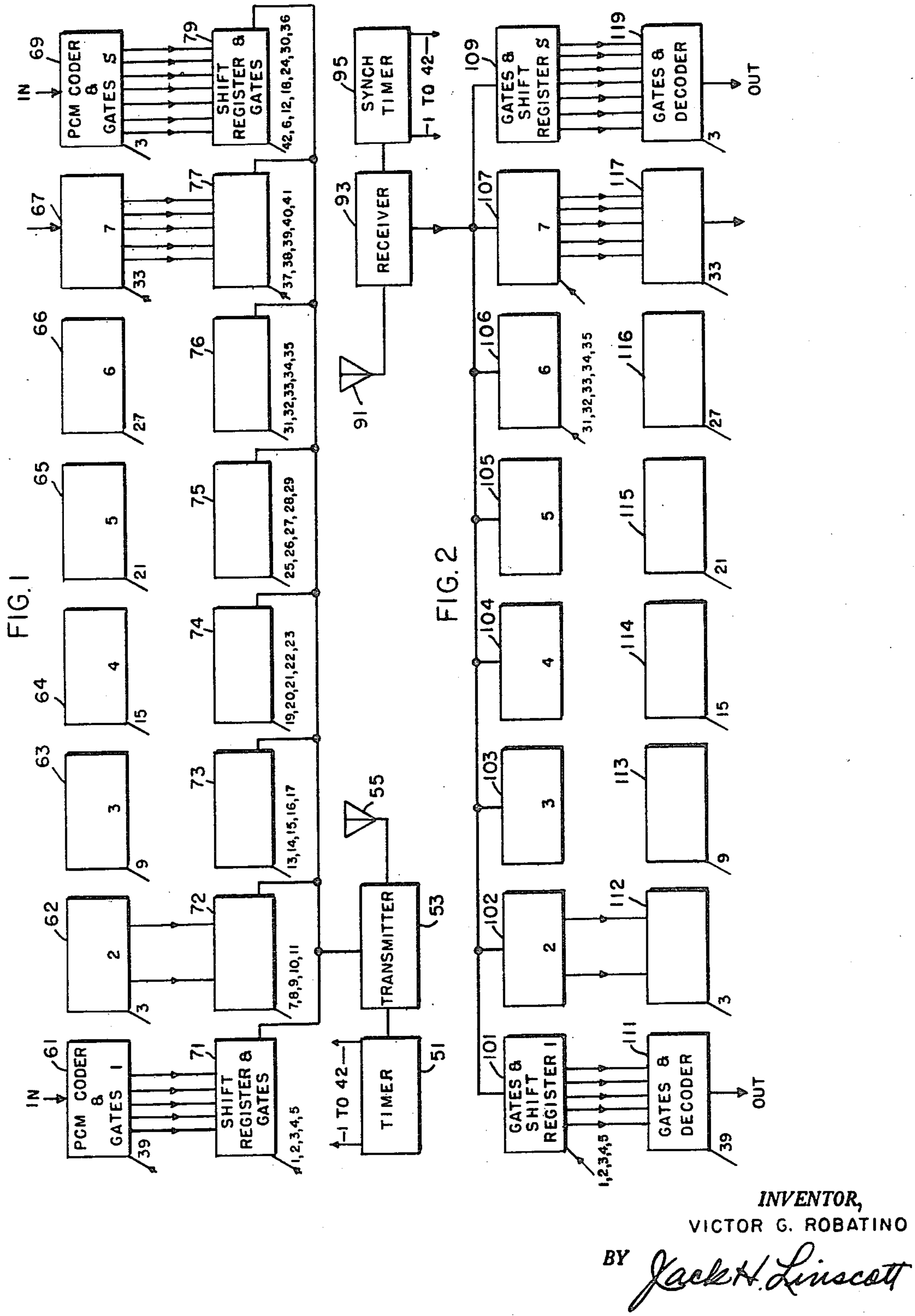

This invention relates to the concealed transmission of certain information within a system for openly transmitting various other information.

Under any conditions countries and commercial organizations may attempt to gain competitive advantages by monitoring known channels of communication, particularly by radio waves through the atmosphere, to learn any information likely to be useful. If the information is readily analyzed, psychological one naturally assumes it is also unimportant. If more difficult to analyze one naturally assumes greater importance and spends still more effort to extract the information.

Under conditions of open war or extreme international tension any country or alliance may cause intentional interference to break down important channels of communication among its enemies. As long as information can be analyzed there is usually a potential value in reviewing its content in the hope of gaining some useful information, and the minor importance does not justify interference to prevent reception by the enemy. If one is not successful in analysis the probable greater importance inferred from the difficulty in analysis may lead to use of such intentional interference. If a communication can be made to appear rather unimportant and yet include substantially concealed information it is likely to be monitored without attempting intentional interference; thus the unimportant information obscures the very existence of the important information and to some extent protects its transmission.

In Patent No. 2,582,968 to Deloraine the unimportant information is transmitted by pulse amplitude modulation and the important information by a rather low percentage time modulation of the same pulses. Careful analysis of the signal would be very likely to reveal the dual modulations and therefore lead to analysis of the time modulation or possibly actual interference with its transmission.

It is an object of this invention to provide a very simple and effective technique and apparatus for concealing the presence of a communication of some importance among other communications of no significant value. Other objects and advantages will be apparent from the following description of the invention.

In the present invention both the unimportant and important information are transmitted by the now prevalent pulse code modulation, and the important information appears to be merely a part of the unimportant information. Both the concept and the required apparatus for such operation are extremely simple. However, even a rather detailed analysis would be very unlikely to raise any suspicion of the dual nature of the signals, and even if suspected the analysis to confirm the actual nature of the signals would be rather difficult.

The technique can be applied with a wide variety of combinations of pulse code modulations from single or multiple channels, but for purpose of illustration the numerical values have been selected in a manner to avoid duplication of such values at different points of the system. Simple six bit (64 level) coding of each sample from seven ordinary voice signals in multiplex (42 bits per complete frame of seven samples) is convenient as a first assumption. If only five bits are actually used for each such sample (35 bits per frame) each sixth least weight bit may be used instead for a concealed signal, a total of seven bits per frame for the concealed signal. In the case of analog (voice, etc.) data for the ordinary signals the presence of the sixth bit would appear entirely natural as an addition to the actual five bits, and in such a simple system some quality deterioration might be considered normal. The enemy would receive as six bits per sample, probably not realizing quality only equal to five bits. Continuation of a prior standard (as five or six bit) and actual use of such standard for some samples, or for all samples whenever concealed signal is not needed, would further tend to avoid suspicion. The concealed signal could be used in any code form such as teletype and could include encryption if desired in case of discovery. However the ordinary signals must be of varying bit significance corresponding to analog information so that the least significant bit may be used for the concealed signal; otherwise, in the case of such data as teletype for the ordinary signals the extra bit would raise suspicion.

The invention is illustrated by the accompanying drawing in which FIG. 1 represents a typical application of the invention to the required transmitter and FIG. 2 to the receiver systems. Many variations of the equipment would be possible within the present state of the art. The particular components used in the drawing were selected mainly for their simplicity in illustrating the desired operation. Similarly the particular time relations illustrated are not critical but have been chosen to permit a rather simple relation between the times used in the transmitter and receiver systems.

In FIG. 1 the timer 51 is illustrated with 42 sequential output leads for the required control of each complete frame of seven ordinary signals each transmitted by six bits, or actually by five bits when practicing the invention with the several sixth bits used for the concealed signals. An output from the timer is also supplied to the actual transmitter 53 and its antenna 55 for use in synchronizing operation at the receiver system.

The several ordinary signal inputs are supplied to identical pulse code modulation coder and gate circuits 61 to 67, which provide the various bits (illustrated as five) corresponding to the selected code for the analog value to be read and permit these bits to be read out at the proper time, indicated by the single numeral 39, 3, 9, etc. at the corner input to the circuit blocks. Ordinarily a simple code involving bit weights 2, 4, 8, 16, and 32 would be used. The input to be concealed is also supplied to a circuit 69 which may be similar to provide its bits (illustrated as seven). The arrangement of the bits is such that those used for the concealed signal correspond to a bit weight of 1 (unity) in the ordinary signal, although they have no such actual bit weight significance and may have none even as to the concealed signal.

The outputs of each such circuit are connected to corresponding shift register and gate circuits 71 to 77 and 79 to store the prior readings without providing an output and then to provide corresponding output bits in sequence to the transmitter 53 at the times indicated by the several numerals 1 to 5, 7 to 11, etc. at the corner input to these circuit blocks. It may be assumed that the register is arranged for the least significant bit first, for simplicity in decoding; the times indicated on circuit 79 are arranged accordingly although this order is not important. Any simple code is suitable for the ordinary signals since it is desirable to provide simple decoding both for the intended receiver and for any interception by others. The less effort used by an enemy in recovering the ordinary signals the less chance that he will cause intentional interference or in making a more detailed analysis stumble upon the concealed signal; however, in this particular case such discovery would be almost exclusively fortuitous since actual analysis would provide no clue to existence of the concealed signal until after discovery of the ordinary signal and the lack of improvement by the extra bits. Again the circuit 79 may differ from the others, using similar or quite different coding.

A review of the timing relations among the several circuits will reveal the most significant features of the operation. As shown in FIG. 1, the ordinary signal input through coder 61 to register 71 is transmitted at times 1 to 5; it is indicated as being read from the coder at time 39 but actually could be read at will from time 6 to 42 (excluding only transmittal times 1 to 5). Similarly the input through coder 62 to register 72 could be transmitted at times 7 to 11, and read from time 12 (through 42) to 6. The same applies to the other inputs through coders 63 to 67. In the case of the concealed input through coder 69 to register 79 the output is transmitted at times 42, 6, 12, 18, 21, 30, and 36, and the reading time indicated as 3 could vary only from 1 to 5; to designate time 7 to 11, 13 to 17, etc. as reading time would make no real difference in operation but would tend to confuse the explanation. The time designations selected have been chosen to combine the bits of a complete set in numerical order. Since the ordinary signals are assumed to be transmitted least significant digit first (weight of two) the concealed signals (apparent weight of one) would in each case appear to relate to the following group of ordinary bits; for this reason the inputs to register circuit 79 are designated in the order 42, 6, 12, 18, 24, 30, and 36 although this does not affect the actual operation.

The receiver system of FIG. 2 is substantially merely the complement of the transmitter of FIG. 1. It includes the antenna 91, receiver 93, and timer 95 synchronized by the receiver to provide outputs 1 to 42 corresponding to those of timer 51, including any delays due to the circuits and the wave propagation from antenna 55 to 91. In this case the register circuits 101 to 107 and 109 convert the proper bit sequences from serial to parallel and the decoder circuits restore the original analog values (except for quantizing effect inherent in PCM systems). Again the circuits 109 and 119 for the concealed signals may differ from those for the ordinary signals. In the simple Shannon type decoder the conversion is directly from serial form to output without a shift register. This is also suitable for a concealed signal appropriately coded, if the time constant corresponds to the different time sequence for the concealed signal. As in the transmitter of FIG. 1 the timing of the samples is not critical, particularly for the ordinary signals. If system delay is a problem it may be minimized by sampling in the transmitter at the last moment and reading in the receiver at the first moment.

It will be readily apparent that the several ordinary inputs in multiplex could be replaced by a single input involving more frequent samples. The concealed input would necessarily be of substantially less bandwidth than such a single ordinary input or the total of the several multiplexed ordinary inputs. Ordinarily the invention would be applied to systems involving serial transmission over one wide band radio wave channel, but would not preclude parallel transmission over several narrower wire-line channels. Similarly the modulation on a radio wave carrier assumed as merely keyed on for mark and off for space might involve instead a pair of simple carriers frequency shift keyed, or a pair of broadband functions similarly keyed. (See "A Matched Filter Communication System for Multipath Channels," Steven M. Sussman, IRE Transactions of the Professional Group on Information Theory, vol. II, 6, No. 3, June 1960.)

A single frame grouping of the ordinary and concealed signals simplifies synchronizing, but is not essential to operation, since the stream of concealed binary data may be quite differently encoded, encrypted if desired, and independently synchronized by any suitable means. While the several bits of an ordinary signal identify an analog sample, those of a concealed signal may identify such a sample or some other coded character (number or letter) or even a more extensive symbol (word, word group, or message). The usual binary code could be ternary instead as in Carbrey Patent No. 2,602,158, and in either case the shift register encoders could be replaced by other means such as cathode ray tube encoders as in Carbrey or Lippel Patent No. 3,015,814. Each analog input could be into a coder as in Lippel, FIG. 11 and coded output through gates timed in the sequence noted in FIG. 1, or analog inputs could be gated into a single coder as in Lippel, FIG. 5 and the properly timed coding coordinate input applied in synchronism to provide such sequence. Many other variations would be apparent to those skilled in the art.

What is claimed is:

1. A digital code signal system comprising:

means to encode each of a first plurality of ordinary analog information samples as a second plurality of digital elements of progressively varying significance, accompanied by an extra element of apparently least significance;

means to encode further information to be concealed as a third plurality of said extra elements corresponding to said first plurality of analog information samples;

and means to transmit the combined output of both said encoding means;

whereby ususal receivers responsive to the encoding of the ordinary information but not the concealed information merely combine such extra elements as elements of least significance of said ordinary information, apparently randomly but imperceptibly varying the decoded values of said ordinary information to avoid revealing the presence of the concealed information.

2. A system as in claim 1 wherein said digital elements correspond to a binary coding of signal bits.

3. A system as in claim 1 wherein said analog samples provide for multiplex transmission from several information sources.

4. A system as in claim 1 wherein all said elements are serially transmitted.

5. A system as in claim 1 wherein said first and third pluralities are equal.

6. A system as in claim 1 wherein said further concealed information also is analog information encoded as elements of progressively varying significance.

7. A system as in claim 1 wherein said further concealed information is also encrypted to further conceal both its presence and its meaning.

8. A digital code signal system comprising:

means to receive the combined transmitted output of a dual digital encoding means;

means to decode each of a first plurality of ordinary analog information samples encoded as a second plurality of digital elements of progressively varying significance, accompanied by an extra element of apparently least significance;

and means to decode further information concealed by encoding as a third plurality of said extra elements corresponding to said first plurality of analog information samples;

whereby usual receivers responsive to the encoding of the ordinary information but not the concealed information merely combine such extra elements as elements of least significance of said ordinary information, apparently randomly but imperceptibly varying the decoded values of said ordinary information to avoid revealing the presence of the concealed information, but said receiving and decoding means separately decodes the ordinary and the concealed information.

9. A method of digital code communication comprising:

encoding each of a first plurality of ordinary analog information samples as a second plurality of digital elements of progressively varying significance, accompanied by an extra element of apparently least significance;

encoding further information to be concealed as a third plurality of said extra elements corresponding to said first plurality of analog information samples;

transmitting the combination of said encoded elements;

whereby usual receivers responsive to the encoding of the ordinary information but not the concealed information merely combined such elements as elements of least significance of said ordinary information, apparently randomly but imperceptibily varying the decoded values of said ordinary information to avoid revealing the presence of the concealed information.

10. A method of digital code communication comprising:

encoding each of a first plurality of ordinary analog information samples as a second plurality of digital elements of progressively varying significance, accompanied by an extra element of apparently least significance;

encoding further information to be concealed as a third plurality of said extra elements corresponding to said first plurality of analog information samples;

transmitting the combination of said encoded elements at one station and receiving at a second station;

decoding each said second plurality of elements to recover said first plurality of samples;

and decoding said extra elements to recover said concealed information;

whereby usual receivers responsive to the encoding of the ordinary information but not the concealed information merely combine such extra elements as elements of least significance of said ordinary information, apparently randomly but imperceptibly varying the decoded values of said ordinary information to avoid revealing the presence of the concealed information, but said two decodings recover both the ordinary and concealed information.

References Cited

UNITED STATES PATENTS 2,413,396 12/1946 Weagant ---------- --179—1.5

RICHARD A. FARLEY, Primary Examiner

C. E. WANDS, Assistant Examiner